C. Austin,
Cutting Sockets in Metal Plates,
N°. 69,303. Patented Oct. 1, 1867.
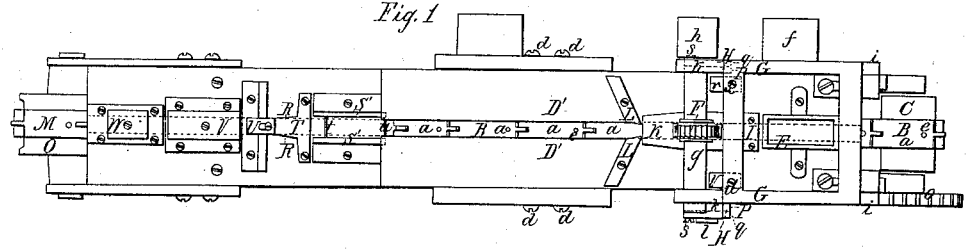
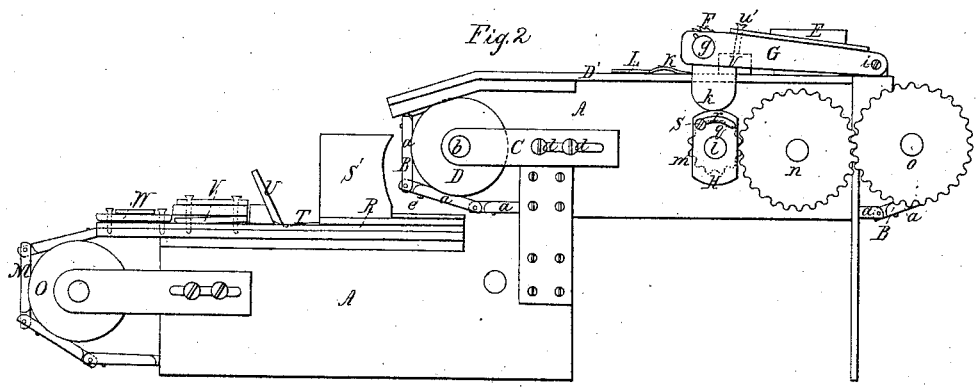
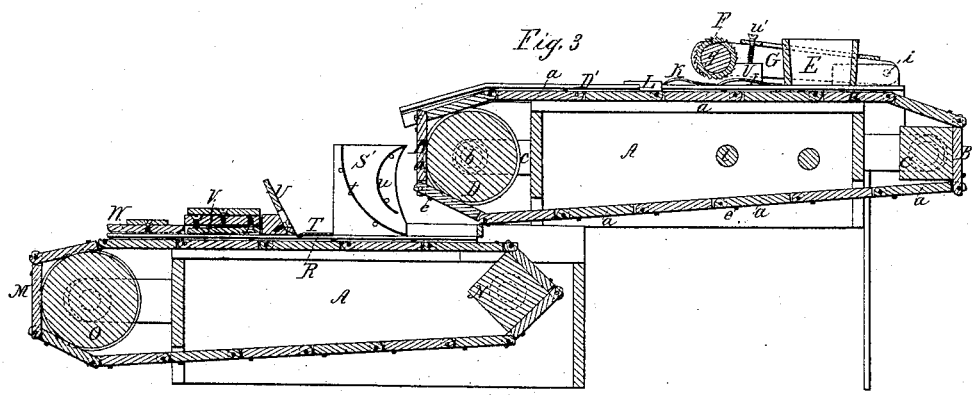
Witnesses
G. H. Andrews
Samuel N. Piper
Inventor
Charles Austin,
by his attorney
R. H. Eddy

United States Patent Office.

CHARLES AUSTIN, OF CONCORD, NEW HAMPSHIRE.

Letters Patent No. 69,303, dated October 1, 1867.

IMPROVEMENT IN MACHINES FOR MAKING SOCKETED REED-PLATES.

The Schedule referred to in these Letters Patent and making part of the same.

TO ALL PERSONS TO WHOM THESE PRESENTS SHALL COME:

Be it known that I, CHARLES AUSTIN, of Concord, in the county of Merrimack, and State of New Hampshire, have made a new and useful Machine for Making Socketed Reed-Plates for Musical Instruments; and I do hereby declare the same to be fully described in the following specification, and represented in the accompanying drawings, of which—

Figure 1 is a top view,
Figure 2 a front elevation, and
Figure 3 a vertical central and longitudinal section of it.

In these drawings, A denotes the frame of the machine, it having arranged within it an endless chain-carrier, B, composed of a series of plates $a\, a\, a$, hinged together at their ends, and being supported on a prismatic driver, C, and a cylindrical roller, D. The shaft $b$ of the roller D rests in adjustable bearings $c\, c$ so applied to the opposite sides of the frame A, and provided with set-screws $d\, d$, as to enable such bearings to be moved horizontally either toward or away from the prismatic driver C, as circumstances may require, and when once adjusted to be fastened in position by such screws. A small stud, $e$, extends from the plate-supporting face of each link or plate of the endless carrier. Over the said carrier are two parallel guides $D'\, D'$ and a hopper, E, the said guides being arranged at a distance apart equal to the width of each of the strips of metal to be converted into a reed-plate. The endless carrier is to be revolved by means of a belt going about a pulley, $f$, fixed on the shaft of the gear $n$. In advance of the hopper is a rotary cutter or cutting-wheel, F, whose shaft $g$ is supported in a vibratory frame, G, and is provided with a driving-pulley, $h$. The said frame G is supported at one end on centres $i\, i$, and has on each side of it a projection, $k$, to rest on the periphery of an adjustable cam, H, fixed on a transverse shaft, $l$, which receives rotary motion by means of a train of gears, $m\, n\, o$, the first of which is fixed on it and the last on the shaft of the prismatic driver C. The adjustable cam consists of two plates, $p\, q$, of like size and shape, their ends being arcs of circles of the same length of radius. One of the said plates, viz, $p$, is fixed to the shaft $l$, and the other, viz, $q$, turns on the shaft, and has a curved slot, $r$, made through it to receive a set-screw, $s$, which goes through the slot and is screwed into the inner plate, and serves to clamp the outer to the inner of the two plates. By turning the outer plate more or less we can vary the lengths of the arcs for supporting the vibratory frame or keeping its cutter out of action on a reed-plate blank. A spring-presser, to keep the plate, while being grooved or recessed by the cutter F, down upon the carrier, is arranged as shown at I, there being another such presser K arranged in advance of it, and just in rear of a pair of chisels or edge-cutters L L, which are arranged in the guides, as shown in figs. 1 and 3, and serve to plane off the opposite edges of a blank so as to reduce the blank to a proper and even width. In advance of and below the endless carrier B is another such carrier, M, provided with like appliances for supporting and revolving it, viz, a prismatic driver, N, and a sustaining-wheel or roller, O, the latter being furnished with adjustable bearings like those of the supporting wheel of the carrier B. Directly over the carrier M is a pair of guides or guide-rails, R R, arranged horizontally, and parallel to each other, and at a distance apart equal to the width of the blank when dressed on its edges. These guides are surmounted by a plate-reverser, S', which is a hopper formed with two curved chutes or deflectors, $t\, u$, arranged as represented in the drawings. This plate-reverser is so disposed with respect to the endless carrier B that each plate or blank on being discharged from the latter may be received into the mouth of the reverser. In falling down on or through the reverser the plate will be turned over or reversed, that is to say, that side of it which was lowermost when the plate was on the carrier B, will be uppermost when the plate is received upon the carrier M. The reverser serves also to cause the plate on leaving it to be deposited on the said carrier M. This latter will force the plate forward and underneath a spring-presser, T, to a plane-iron or cutter, U, arranged as shown in the drawings. The purpose of this plane-iron U is to plane down the upper surface of the reed-plate or reduce the plate to its proper thickness. In advance of the plane-iron U is a weighted smoother, V, or board or plate prepared with an emery-coated bottom, or with file teeth, such board or plate being free to play vertically. A finisher, W, is arranged in advance of the smoother, and is like it in all respects except in having its lower surface coated with rotten-stone and oil, or other suitable preparation for polishing or finishing the surface of the blank while driven forward underneath the said finisher. For determining the depth of cut of the wheel F its vibratory frame G is provided with stop-screws $u'$ $u'$, which screw down through it and against stops $v$ $v$ raised on the frame of the machine.

By means of the above-described machine a pack of blanks, or rectangular plates, of the proper size, after having been introduced into the hopper E, may be successively recessed, reduced to a proper width and thickness, and be smoothed and finished ready for reception of their reeds, it being understood that each of them, prior to being introduced into the machine, has had a reed-slot made in it. The adjustable cam serves to regulate the length of cut made by the rotary cutter.

I claim as my invention in the above machine the following, viz:

I claim the combination as well as the arrangement of the guides D' D', the endless carrier B, the presser I, the rotary cutter F, the vibratory frame G, and the adjustable cam H, as described, the said cutter F, carrier B, and cam H, being provided with mechanism for operating them, substantially as described.

I also claim the combination as well as the arrangement of the hopper E, the guides D' D', the endless-carrier B, the presser I, the rotary cutter F, the vibratory frame G, and the adjustable cam H, as described, they being provided with mechanism for operating the carrier, the cutter, and the cam, as explained.

I also claim the adjustable cam H, made substantially as described.

I also claim the combination as well as the arrangement of two or any other suitable number of edge-cutters L L, and one or more pressers I K with the endless carrier B, the guides D' D', the rotary cutter F, the vibratory frame G, and the adjustable cam H, or the same and the hopper E, the whole being to operate together, and provided with mechanism for actuating the carrier, the cutter, and the cam, substantially as hereinbefore explained.

I also claim the combination as well as the arrangement of the two endless carriers B M, one or more side-trimmers or plane-irons U, the guides D' D' R R, the reverser S, the cutter F, the vibratory frame G, and the adjustable cam H, the carriers, cutter, and cam being provided with operative mechanism, substantially as described.

I also claim the combination as well as the arrangement of one or more smoothers V, one or more finishers W, the plane-iron U, the reverser S, the endless carriers B M, the guides D' D' R R, the cutter F, the vibratory frame G, and the adjustable cam H, the whole being provided with mechanism for operating the carriers, the cutter, and cam, substantially as described.

I also claim the combination as well as the arrangement of the hopper E, the guides D' D', the carrier B, one or more pressers I K, the rotary cutter F, the vibratory frame G, the edge-cutters L L, the reverser S, the guides R R, the carrier M, the face-cutter U, or the latter and the presser T; also, their combination as well as their arrangement with one or more smoothers V or one or more finishers W, the carriers and cam and rotary cutter being provided with mechanism for operating them, substantially as hereinbefore specified.

CHARLES AUSTIN.

Witnesses:
R. H. EDDY,
F. P. HALE, Jr.